(12) United States Patent  
Bodley (10) Patent No.: US 7,089,042 B2
(45) Date of Patent: Aug. 8, 2006

(54) HEADSET WITH VARIABLE GAIN BASED ON POSITION OF MICROPHONE BOOM

(75) Inventor: Martin Reed Bodley, Sudbury, MA (US)

(73) Assignee: Fellowes, Inc., Itasca, IL (US)

(*) Notice: Subject to any disclaimer, the term of this patent is extended or adjusted under 35 U.S.C. 154(b) by 163 days.

(21) Appl. No.: 10/753,077

(22) Filed: Jan. 8, 2004

(65) Prior Publication Data

US 2005/0153748 A1 Jul. 14, 2005

(51) Int. Cl.
*H04B 1/00* (2006.01)

(52) U.S. Cl. .............. 455/569.1; 455/575.1; 455/575.2; 455/575.3; 455/575.4; 455/575.6; 455/570; 455/569; 381/122; 381/111; 381/390; 381/74; 381/104; 381/107; 381/370

(58) Field of Classification Search .......... 381/122, 381/111, 390, 74, 104, 107, 370, 378, 330; 455/570, 575.2, 575.4, 569
See application file for complete search history.

(56) References Cited

U.S. PATENT DOCUMENTS

| 2,428,746 | A |   | 10/1947 | Veneklasen |
| 3,621,156 | A | * | 11/1971 | Kliewer ............... 379/430 |
| 4,020,297 | A |   | 4/1977 | Brodie |
| 4,484,029 | A |   | 11/1984 | Kenney |
| 5,381,486 | A | * | 1/1995 | Ludeke et al. ............ 381/375 |
| 5,504,812 | A |   | 4/1996 | Vangarde |
| 5,557,653 | A |   | 9/1996 | Paterson et al. |
| 5,673,325 | A | * | 9/1997 | Andrea et al. ............ 381/92 |
| 5,732,143 | A |   | 3/1998 | Andrea et al. |
| 5,825,897 | A |   | 10/1998 | Andrea et al. |
| 6,016,347 | A |   | 1/2000 | Magnasco et al. |
| 6,061,456 | A |   | 5/2000 | Andrea et al. |
| 6,069,959 | A |   | 5/2000 | Jones |
| 6,320,960 | B1 |   | 11/2001 | Lathrop, III et al. |
| 6,470,197 | B1 | * | 10/2002 | Tuoriniemi et al. ....... 455/575.2 |
| 6,594,366 | B1 | * | 7/2003 | Adams .................. 381/74 |
| 2002/0067825 | A1 |   | 6/2002 | Baranowski et al. |
| 2002/0071586 | A1 |   | 6/2002 | Sung |
| 2002/0098877 | A1 | * | 7/2002 | Glezerman ............. 455/568 |
| 2002/0193151 | A1 |   | 12/2002 | Edreich |
| 2003/0003969 | A1 | * | 1/2003 | Tong et al. ............. 455/568 |
| 2003/0050011 | A1 |   | 3/2003 | Palermo et al. |
| 2003/0108214 | A1 |   | 6/2003 | Brennan et al. |

FOREIGN PATENT DOCUMENTS

WO    WO 99/17586    4/1999

* cited by examiner

*Primary Examiner*—Nick Corsaro
*Assistant Examiner*—Emem Ekong
(74) *Attorney, Agent, or Firm*—Pillsbury Winthrop Shaw Pittman, LLP (57) ABSTRACT

The present invention relates to a headset having an adjustable microphone boom wherein gain applied to the microphone signal is varied based on the position of the boom.

17 Claims, 8 Drawing Sheets

HEADSET WITH VARIABLE GAIN BASED ON POSITION OF MICROPHONE BOOM

FIELD OF THE INVENTION

The present invention relate to a headset having an adjustable microphone boom wherein gain applied to the microphone signal is varied based on the position of the boom

BACKGROUND OF THE INVENTION

Headsets with extendible and retractable booms are known in the art. Typically, these headsets use rather sophisticated processing to filter out background noise. This processing is relatively expensive and consumes power, which is an issue since this power is typically drawn from a battery in the headset or in a communication device to which the headset is connected. The present invention endeavors to provide a more simplified approach to dealing with background noise issues.

SUMMARY OF THE INVENTION

One aspect of the present invention provides a headset comprising a main body, a speaker carried by the main body, a microphone boom carried by the main body and having a distal end portion, and a microphone carried on the distal end portion of the microphone boom. The main body has an attachment structure constructed to attach the headset in an operative position to the head of a user. The speaker is positionable adjacent a user's ear when the headset is attached in the operative position, and operable to output audible noise based on a speaker input signal transmitted to the speaker. The microphone is operable to receive audible noise and transmit a microphone output signal based on the received audible noise.

The microphone boom is movable between a retracted position and an extended position. The distal end portion is positioned further forwardly towards the mouth of the user when the headset is attracted in the operative position so as to be closer to the user's mouth than in the retracted position. Circuitry carried by the main body is connected to the speaker and microphone. The circuitry is operable to transmit and receive signals from a communications device, to transmit the speaker input signal to the speaker, and to receive the microphone output signal from the microphone to thereby establish communication between both the speaker and the microphone and the communications device. The headset also comprises at least one sensor coupled to the circuitry for sensing a position of the microphone boom. The circuitry is further operable to apply a gain to the microphone output signal, the gain being varied based on the position of the microphone boom as sensed by the at least one sensor such that the gain is greater when the microphone boom is in the retracted position thereof than when the microphone boom is in the extended position thereof.

Another aspect of the invention provides a method for reducing background noise in a microphone output signal in a headset. The headset comprises a main body; a microphone boom carried by the main body and having a distal end portion; and a microphone carried on the distal end portion of the microphone boom. The microphone is operable to receive audible noise and transmit a microphone output signal based on the received audible noise. The microphone boom is movable between a retracted position and an extended position. The distal end portion is positioned further forwardly towards the mouth of the user when the headset is attached to the user's head in the operative position so as to be closer to the user's mouth in the extended position than in the retracted position.

The method comprising:
sensing a position of the microphone boom; and
applying a gain to the microphone output signal, the gain being varied based on the sensed position of the microphone boom such that the gain is greater when the microphone boom is in the retracted position thereof than when the microphone boom is in the extended position thereof.

Other objects, features, and advantages of the present application will become apparent from the following detailed description, the accompanying drawings, and the appended claims.

DETAILED DESCRIPTION OF THE ILLUSTRATED EMBODIMENT OF THE INVENTION

The Figures illustrate one example of a headset, generally indicated at 10, constructed in accordance with the present invention. The illustrated headset 10 is of the wireless type that communicates without the use of a wired connection to a communication device, such as a wireless telephone, PDA or any other device capable of being used for communicating data or voice signals. Such a wireless connection may be accomplished using the BLUETOOTH™ protocol, or any other suitable protocol. Of course, the present invention could be applied to traditional wired headsets that connect to a communication device using a pair of wires and a jack that plugs into a corresponding socket on a communications device. The illustrated headset is only an example and its construction should not be considered limiting in any way.

The headset 10 comprises a main body 12, a speaker 14 carried by the main body 12, a microphone boom 16 carried by the main body 12 and having a distal end portion 18, and a microphone 20 carried on the distal end portion 18 of the microphone boom 16.

The illustrated main body 12 is a molded plastic shell formed of halves coupled together and houses internal circuitry that provides the operative functions of the headset 10, which will be discussed below. The illustrated construction is not intended to be limiting and the main body 12 may have and shape, construction or configuration.

The main body 12 has an attachment structure 22 constructed to attach the headset 10 in an operative position to the head of a user. The term "operative position" means the position in which the headset 10 is designed to be worn by the user during normal use. This attachment structure 22 may be in the form of an earhook having a general C-shape as shown in the drawings, or may be any other suitable structure for attaching the headset 10 in an operative position to the user's head. For example, the attachment structure 22 may be attached to the user's head by a resilient C-shaped member that fits laterally over the user's head.

In the illustrated embodiment, the earhook has an elongated portion 24 bent into the general C-shape and is designed to fit between the pinna of a wearer's ear and his/her head. A proximal end portion 26 of the elongated portion 24 is connected, either integrally or by some attachment means, such as an adhesive, heat staking, ultrasonic welding, or a snap-fit, to an upper front portion of the main body 12. A distal end portion 28 carries a speaker housing 30 in which the speaker 14 (see FIG. 5) is received.

The speaker housing 30 is rotatably mounted to the distal end portion 28 of the elongated portion 24, and enables the speaker housing to be oriented between a use position for receipt in a wearer's right ear (shown in FIGS. 1–5) or a use position for receipt in a wearer's left ear (not shown, but being understood as rotated approximately 180 degrees from the position shown in FIGS. 1–5). The shaping of the elongated portion 24 is such that it passes over the point where the front portion of a wearer's ear attaches to the head and then extends downwardly and backwards to position the speaker housing 30 adjacent the opening leading to the wearer's ear canal. This construction allows the speaker to be positioned so as to be located adjacent a user's ear when the headset 10 is attached in the operative position. The speaker housing 30 has an opening 32 at the distal end thereof for directing audible noise emanating from the speaker 14 into the wearer's ear. Preferably, the elongated portion 24 is made from a somewhat resilient material enabling it to flex and conform comfortably to ears of different sizes and shapes. Further, for enhanced comfort, the inner radius of the elongated portion 24 (i.e., the portion that engages the wearer's ear) may be provided with a soft deformable material 34, such as a foam rubber or some other ergonomically acceptable material. This material 24 may be attached by an adhesive, molding, ultrasonic welding, or any other suitable method of attachment. It should be understood that the speaker 14 may be carried by the main body 12 either directly thereon or indirectly by another structure in any suitable manner so as to be located adjacent a user's ear when the headset 10 is attached in the operative position. The illustrated construction with the speaker 14 on the earhook is provided only as an example and in no way is intended to be limiting.

As is well known in the art, the speaker 14 is operable to output audible noise based on a speaker input signal transmitted to the speaker 14. This speaker input signal is delivered to the speaker 14 from the circuitry 48 that operates the headset 10 and receives an input signal from the communications device to which it is communicated. The speaker 14 may be a transducer that converts this electrical signal to generate an audible noise that can be heard by the wearer. The speaker 14 may have any construction and the invention is not intended to be limited to any particular type.

The microphone boom 16 is movable between (1) a retracted position wherein, when the headset 10 is attracted in the operative position, the distal end portion 16 is positioned forwardly towards a mouth of the user, and (2) an extended position wherein, when the headset is attached in the operative position, the distal end portion 16 is positioned further forwardly towards the mouth of the user so as to be closer to the user's mouth than in the retracted position. The retracted position is shown in solid lines in FIG. 5, and the extended position is shown in dashed lines in FIG. 5. This positions the microphone 20 towards the wearer's mouth in the retracted position, and then positions the microphone 20 further forwardly towards the wearer's mouth in the extended position.

In the illustrated embodiment, the main body 12 has a forwardly projecting portion 36 with a generally tubular configuration and defines a forwardly facing boom receiving opening 38. A proximal end portion 40 of said microphone boom 16 is slidably mounted within the boom receiving opening 38 for movement between the retracted and extended positions. Specifically, in the retracted position, the illustrated boom 16 is slid back through the boom receiving opening 16 to be almost entirely received within the tubular projection 36, and in the extended position, the boom 16 is extended forwardly so that most of its length is projecting forwardly from the opening 38. The proximal end portion 40 of the boom 16 includes a leaf spring 42 mounted thereto by any suitable method, such as by in-place molding, adhesive, or otherwise. The leaf spring 42 has a free end that engages a retracted position detent structure in the form of a ledge 44 at the upper end of the tubular projection 36 in a detent-like manner to releasably resist movement of the boom 16 from its retracted position. Likewise, the leaf spring's free end engages an extended position detent structure in the form of a groove 46 located forwardly in the projection 36 to releasably resist movement of the boom 16 forwardly from its extended position. The ledge 44 and the groove 46 in the illustrated embodiment are provided on a track 50 (see FIG. 7) that is assembled in the projection 36. This construction for mounting the microphone boom 16 should be understood as being an example only and any other suitable construction or arrangement may be used to mount the boom 16 for movement between extended and retracted positions.

The microphone 20 is operable to receive audible noise, such as speech emanating from the wearer's mouth and possibly some background noise, and transmit a microphone output signal based on the received audible noise. This microphone output signal is transmitted to the circuitry 48 in the main body 12 that operates the headset 10 and delivers an output signal to the communications device to which it is communicated. The microphone 20 may be a transducer that converts this audible noise to generate an electrical signal that can be processed by the circuitry. The microphone 20 may have any construction and the invention is not intended to be limited to any particular type.

An electrical connection between the microphone 20, the speaker 14, and the circuitry 48 may be established through conductive wiring extended through the elongated position 24 and the microphone boom 16. The passages for accommodating such wiring are not specifically shown, but are readily understood. Any other suitable arrangement also may be used.

Figure 1:
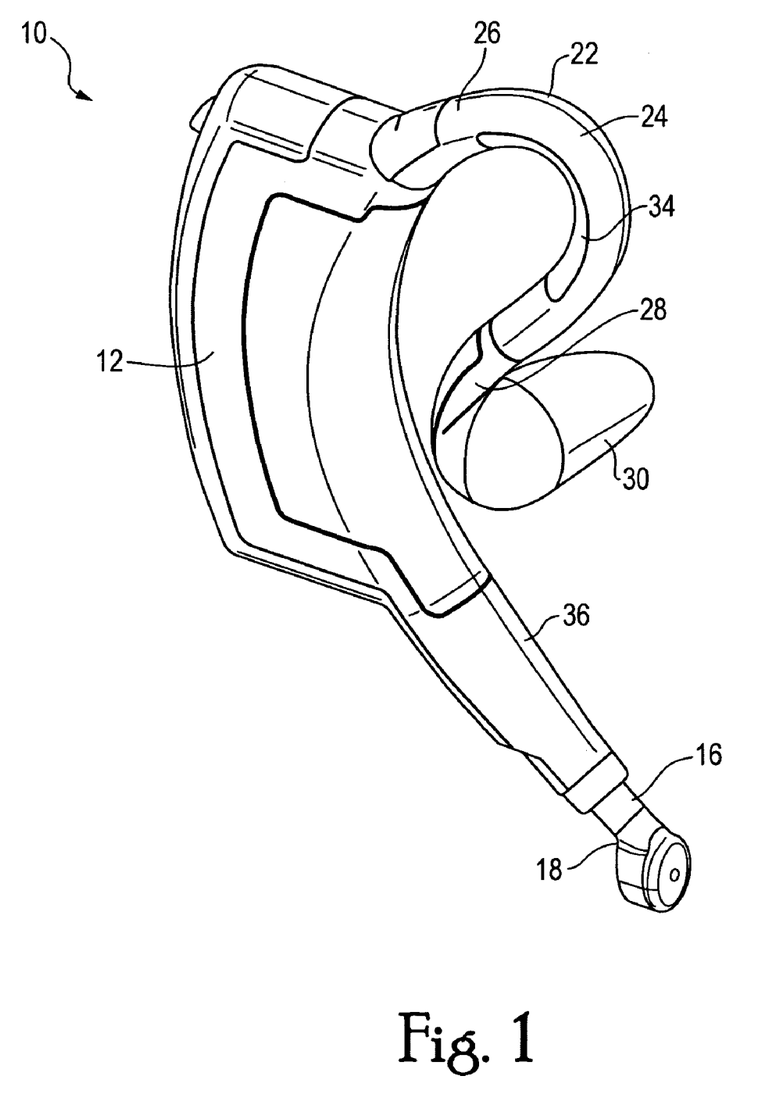
FIG. 1 is a perspective view of a headset constructed according to the present invention, the perspective being taken from the top and front thereof.
Figure 2:
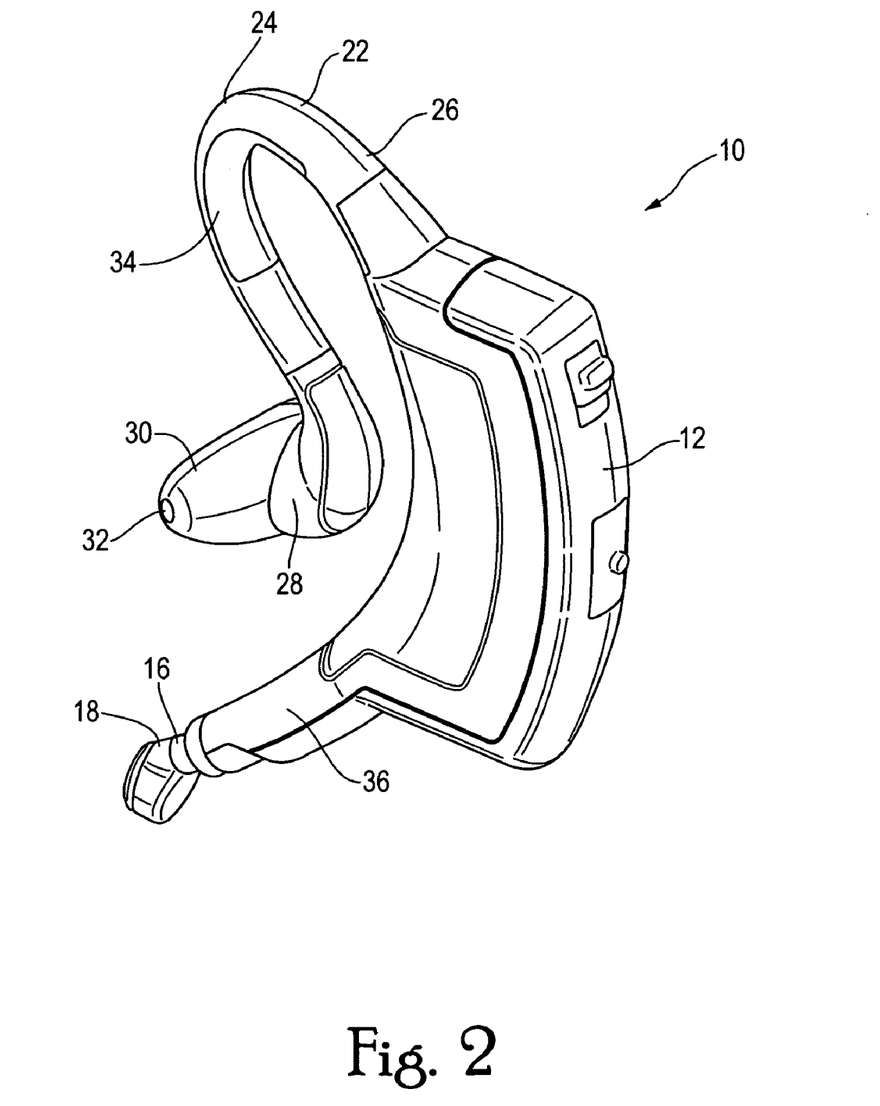
FIG. 2 is a perspective view of the headset of FIG. 1, the perspective being taken from the rear and top thereof.
Figure 3:
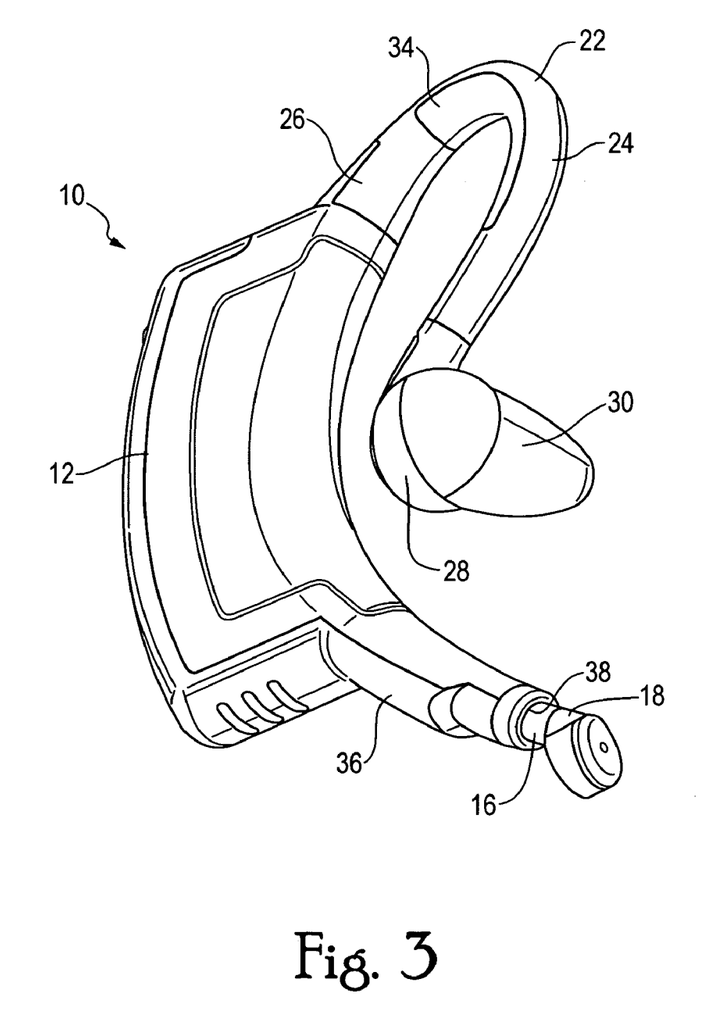
FIG. 3 is a perspective view of the headset of FIG. 1, the perspective being taken from the front and bottom thereof.
Figure 4:
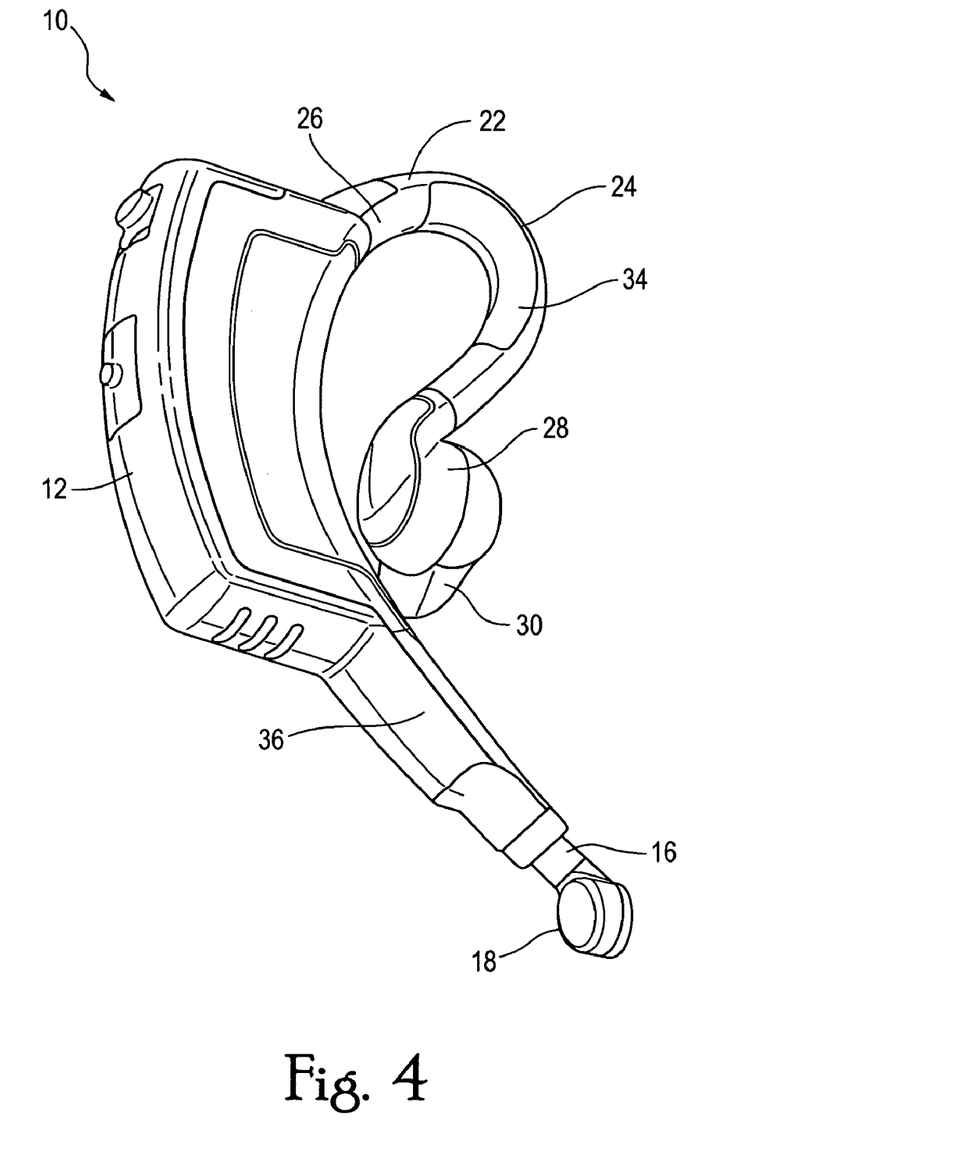
FIG. 4 is a perspective view of the headset of FIG. 1, the perspective being taken from the rear and bottom thereof.
Figure 5:
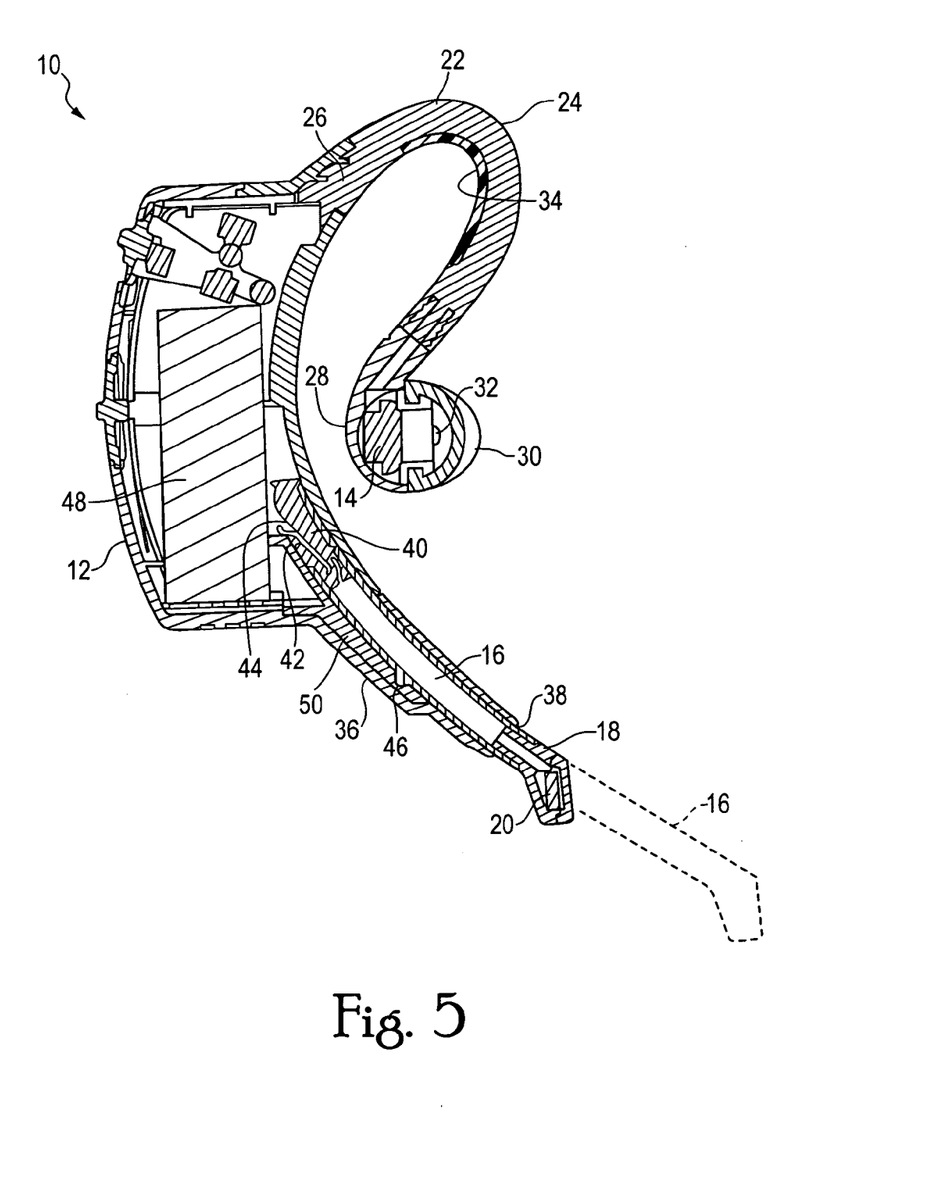
FIG. 5 is a cross-sectional view of the headset of FIG. 1.
Figure 6:
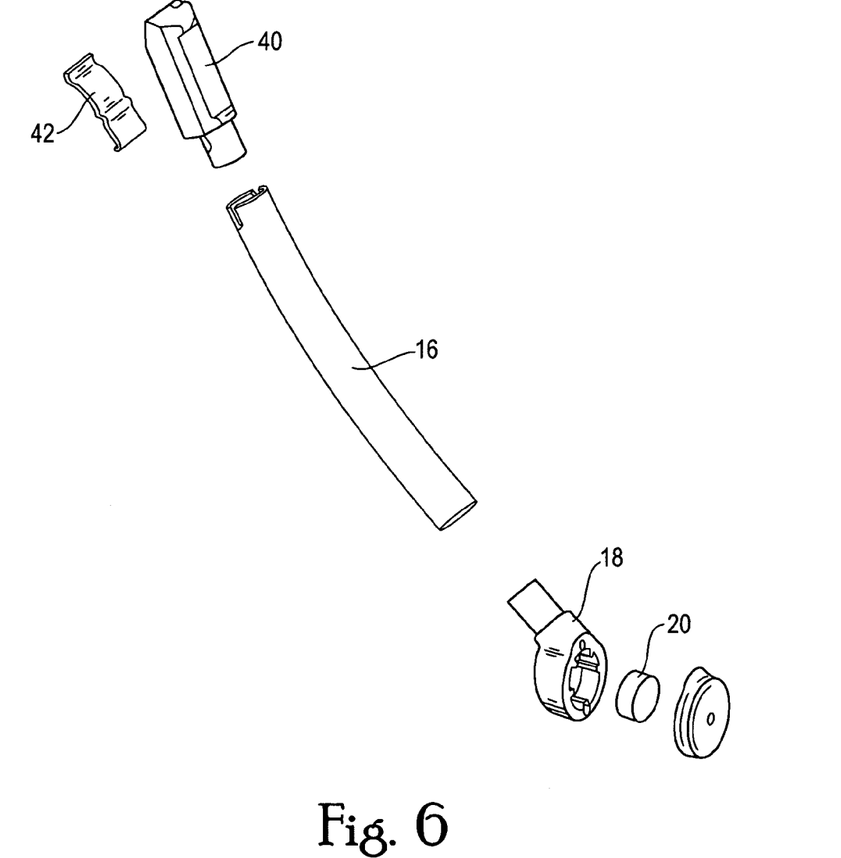
FIG. 6 is an exploded view of the microphone boom used in the headset of FIG. 1.

The circuitry carried by the main body is shown schematically at 48 in FIG. 5 and may have any construction or arrangement. The circuitry 48 may include a main processor for performing its functions, may be digital or analog, and may perform any number of functions, including processing and management of the speaker input signal, the microphone output signal, and the signals sent to and from the communications device. Generally, the circuitry 48 is operable to transmit and receive signals from a communications device, to transmit the speaker input signal to the speaker 14, and to receive the microphone output signal from the microphone 20 to thereby establish communication between both the speaker 14 and the microphone 20 and the communications device. The circuitry 48 also may be operable, for example, to control the volume level of the speaker 14. The circuitry 48 in the illustrated embodiment operates on the BLUETOOTH protocol to communicate wirelessly with the communications device, but may operate in accordance with any other protocol. Additionally, the invention may be practiced in a system wherein the headset circuitry 48 communicates to the communications device via standard wiring having a plug that is received in a port on the communications device. Generally, the circuitry 48 may be of any type and operate in any manner, and the circuitry 48 and functionality discussed herein should not be considered as limiting.

The headset 10 includes least one sensor for sensing a position of the microphone boom 16. The circuitry 48 is further operable to apply a gain to the microphone output signal to create a modified microphone output signal for transmission to the communications device. As will be discussed below, this gain is varied based on the position of the microphone boom 16 as sensed by the at least one sensor such that the gain is greater when the microphone boom 16 is in the retracted position thereof than when the microphone boom 16 is in the extended position thereof.

By having a reduced gain when the boom 16 is in the extended position, the invention avoids the need for more complex and more expensive power consuming processing hardware/software for filtering background noise. Specifically, in the retracted position, because the microphone 20 is further away from the wearer's mouth, a higher gain is used to modify the microphone output signal so that the wearer's speech component of the signal is at a desired level. However, when the boom is in the extended position, the microphone 20 is closer to the wearer's mouth and the gain applied to the microphone output signal can be reduced to maintain the speech component at that desired level (assuming the user is speaking at a constant level). This reduction in gain will advantageously reduce the amount of background noise picked up by the microphone 20 and transmitted in the microphone output signal. This is because the movement of microphone boom 16 to the extended position increases the proximity of the microphone 20 to the wearer's mouth by an amount whereby less gain can be used, but does not substantially change the proximity of the microphone 20 relative to most background noise sources. Thus, reducing the gain when the boom 16 can effectively lower the amplitude or level of the background noise component in the microphone output signal without significantly affecting the speech component of the microphone output signal. Preferably, but not necessarily, the gains are selected such that the level of the user's speech component is at essentially the same level in both the extended and retracted positions of the boom 16 for a given level of wearer speech.

In the illustrated embodiment, the extended position of the boom 16 is approximately 1.5 inches forward of the retracted position of the boom 16 and the gain applied to the microphone output signal at the retracted position is approximately 6 dB greater than the gain applied at the extended position. However, any variation on these specific numbers may be practiced and they will vary based on such factors as the configuration and positioning of the headset, the type of microphone used, etc. Also, it should be understood that the term gain does not actually mean that the signal must be increased. For example, the gain in the extended position could be unity gain, which simply means that no gain is applied at all, (i.e., a gain of 1.0). Likewise, the gain in the extended position could be less than one so that the signal strength is decreased below its output level.

Figure 7:
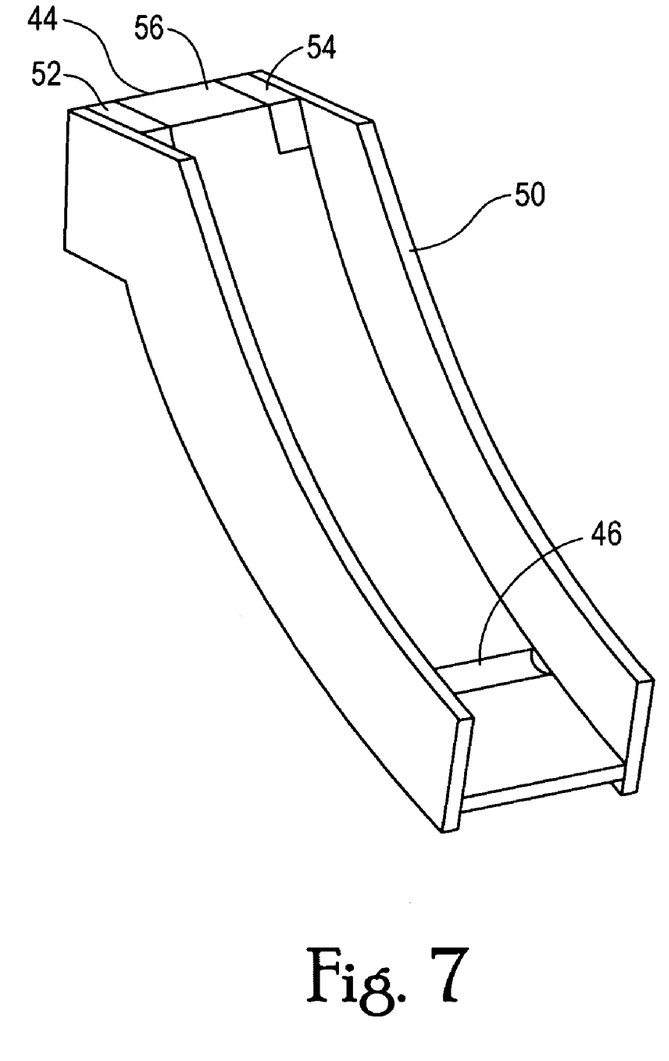
FIG. 7 is a perspective of a track in which the microphone boom of FIG. 6 moves.

Referring to FIG. 7, the track 50 includes at the proximal end thereof a pair of spaced apart conductive terminals 52, 54. The track 50 is plastic, so the structure 56 between the terminals 52, 54 keeps them electrically isolated from one another so that current cannot flow from one terminal to the other. These terminals 52, 54 constitute a switch. In the embodiment of FIG. 7, only a single switch 5 is used, but as will be discussed below, multiple switches may also be used.

These terminals 52, 54 are provided on the ledge 44 and are contacted by the metallic leaf spring 42 of the boom 16 when the boom 16 is in the retracted position. By this contact, the leaf spring 42 bridges the terminals 52, 54 so that a current can flow from one to the other. The circuitry 48 applies a potential to the terminals 52, 54 so that, when the leaf spring 42 contacts the terminals 52, 54, the switch is in a closed state and current can flow therethrough. This indicates to the circuitry that the boom 16 is in the retracted position, and the circuitry 48 will responsively apply the higher gain to the microphone output signal corresponding to the boom's retracted position as discussed above. When the boom 16 is moved out of the retracted position, the leaf spring 42 will be out of contact with the terminals, thus establishing an open state for the switch with no current flowing therethrough. In this single switch embodiment, the circuitry 48 will treat this open state as indicating that the boom 16 has moved to the extended position, and will responsively apply the lower gain to the microphone output signal corresponding to the boom's extended position as discussed above.

Alternatively, there could be provided a metallic structure that is biased into contact with the terminals 52, 54 when the boom 16 is out of the retracted position, and is moved out of contact with the terminals 52, 54 when the boom 16 is moved into the retracted position. Thus, the open and closed states would be reversed relative to indicating when the boom 16 is in the retracted position. Therefore, this switch may be more broadly described as switching between a first state and a second state. This same modification could be applied to the other switches discussed below.

Figure 8:
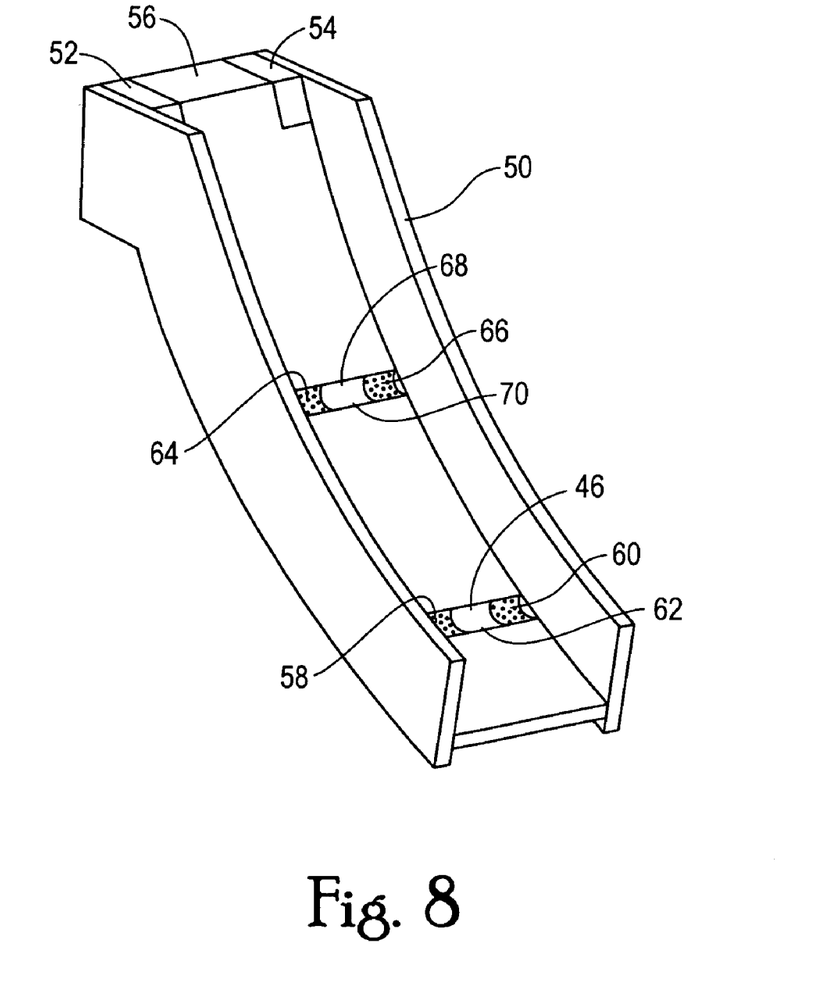
FIG. 8 is a perspective of an alternative embodiment of the track of FIG. 7.

Referring to FIG. 8, that embodiment includes a plurality of switches corresponding to various positions of the boom 16. These switches include at least a first switch, which has the same terminals 52, 54 discussed above, and a second switch including terminals 58, 60. The construction of the second switch is essentially the same as the first switch, but with the terminals 58, 60 residing in groove 46 and electrically isolated by structure 62. Similarly to the embodiment of FIG. 7, a potential is applied to the terminals 52, 54 and another potential is applied to terminals 58, 60. When the boom 16 is in the retracted position, the leaf spring 42 contacts terminals 52, 54 to establish a closed state for the first switch and enable current to flow therethrough, while the second switch is in an open state with no current flowing therethrough. This indicates to the circuitry 48 that the boom 16 is in the retracted position, and the circuitry 48 will responsively apply the higher gain to the microphone output signal as discussed above. When the boom 16 is in the extended position, the leaf spring 42 contacts terminals 58, 60 to establish a closed state for the second switch and enable current to flow therethrough, while the first switch is in an open state with no current flowing therethrough. This indicates to the circuitry 48 that the boom 16 is in the extended position, and the circuitry 48 will responsively apply the lower gain to the microphone output signal as discussed above.

When the boom 16 is between the extended and retracted positions and both switches are both in their open state, the circuitry 48 may default to using the lower gain corresponding to the extended position, or the higher gain corresponding to the retracted position, or may use a gain that is intermediate those higher or lower levels. Preferably, the detent action provided by the leaf spring 42 will provide tactile or audible feedback (e.g., clicking) indicating to the user that he/she has extended or retracted the boom 16 to the appropriate position to minimize instances where the boom 16 is left between these positions.

Alternatively, one or more additional switches may be included. FIG. 8 also shows an optional third switch with terminals 64, 66 spaced by structure 68. Another potential is applied to these terminals 64, 66 in the same manner as terminals 52, 54 and 58, 60. These terminals 64, 66 are also provided in a groove 70 between ledge 44 and groove 46. When the boom 16 is in an intermediate position, the leaf spring 42 engages in this groove 70 and contacts the terminals 64, 66. This establishes a closed state for the third switch and enables current to flow therethrough, while the other switches are open. This indicates to the circuitry 48 that the boom 16 is in this intermediate position, and the circuitry can apply an intermediate gain to the microphone output signal accordingly. The leaf spring 42 will also be received in the groove 70 to releasably maintain the boom in this intermediate position. Any number of switches can be used in the device, and the invention is not limited to only the three illustrated, and more or less can be used.

The illustrated sensors for sensing the position of the boom 16 are illustrative only and are not intended to be limiting. Any other suitable sensor(s) may be used. For example, proximity sensors with magnetic reed switches that detect the proximity of a metal structure on the boom 16 may be used. Likewise, contact switches that are moved between states as the boom 16 slides over them may be used. Also, a potentiometer or other sensor that continuously senses the position of the boom 16, as opposed to sensing distinct boom positions, may be used.

In one illustrative embodiment, the switches described can be connected to general purpose input/output pins of a microprocessor contained within the circuitry 48. The microprocessor can use a relatively simply algorithm to monitor the state of the switches and drive a standard gain circuit accordingly to apply the appropriate gain to the microphone output signal. Alternatively, the gain circuit could have a series of resistors that are connected to the switches such that as the switches change states, the resistors can be coupled to or decoupled from the gain circuit to change the overall resistance of the gain circuit, thereby changing the gain it applies to the microphone signal.

Preferably, in systems such as one that operates on the BLUETOOTH protocol where the analog microphone output signal is converted from analog to digital by a CODEC, the gain would be applied to the microphone output signal prior to being transmitted to the CODEC. However, the system could be modified to apply a gain to the modified digital signal corresponding to the microphone output signal, instead of to the analog signal. Generally, the terminology of applying a gain to the microphone output signal does not necessarily mean that the gain must be applied directly to the signal the emanates directly from the microphone, and instead the gain may be applied prior to transmission to the communications device to any derivative of that signal, such as may be created by processing, filtering, A/D conversion, or other modification.

The foregoing illustrated embodiment has been provided solely to illustrate the functional and structural principles of the present invention and is not intended to be limiting. To the contrary, the present invention is intended to encompass all modifications, alterations, substitutions, additions, and equivalents within the spirit and scope of the appended claims.

What is claimed is:

1. A headset comprising:
   a main body with an attachment structure constructed to attach the headset in an operative position to the head of a user;
   a speaker carried by the main body, the speaker being positionable adjacent a user's ear when the headset is attached in the operative position, the speaker being operable to output audible noise based on a speaker input signal transmitted to the speaker;
   a microphone boom carried by the main body and having a distal end portion;
   a microphone carried on the distal end portion of the microphone boom, the microphone being operable to receive audible noise and transmit a microphone output signal based on the received audible noise;
   the microphone boom being movable between a retracted position and an extended position, the distal end portion being positioned further forwardly towards the mouth of the user when the headset is attached to the user's head in the operative position so as to be closer to the user's mouth in the extended position than in the retracted position;
   circuitry carried by the main body and connected to the speaker and microphone, the circuitry being operable to transmit and receive signals from a communications device, to transmit the speaker input signal to the speaker, and to receive the microphone output signal from the microphone to thereby establish communication between both the speaker and the microphone and the communications device;
   at least one sensor coupled to the circuitry for sensing a position of the microphone boom;
   the circuitry being further operable to apply a gain to the microphone output signal, the gain being varied based on the position of the microphone boom as sensed by the at least one sensor such that the gain is greater when the microphone boom is in the retracted position thereof than when the microphone boom is in the extended position thereof.

2. A headset according to claim 1, wherein the extended position of the boom is approximately 1.5 inches forward of the retracted position of the boom.

3. A headset according to claim 2, wherein the gain applied at the retracted position is approximately 6 dB greater than the gain applied at the extended position.

4. A headset according to claim 1, wherein the attachment structure is an earhook having a general C-shape configured to fit over a user's ear to attach the headset in the operative position to the head of the user.

5. A headset according to claim 1, wherein the main body has a forwardly facing boom receiving opening and wherein a proximal end portion of said microphone boom is slidably mounted within said boom receiving opening for movement between said retracted and extended positions.

6. A headset according to claim 1, wherein said at least one sensor includes at least one switch coupled to the circuitry.

7. A headset according to claim 6, wherein said at least one switch is a single switch, said single switch switching from a first state when the boom is in one of the extended and retracted positions to a second state when the boom is moved out of said one of the extended and retracted positions.

8. A headset according to claim 7, wherein the at least one switch is in the first state when the boom is in the retracted position and is in the second state when the boom is moved out of the retracted position.

9. A headset according to claim 8, wherein the first state is a closed state wherein a current flows through the switch to indicate that the boom is in the retracted position, and wherein the second state is an open state wherein the current is interrupted to indicate the boom is moved out of the retracted position.

10. A headset according to claim 6, wherein the at least one switch comprises a plurality of switches including at least a first switch and a second switch, the first switch switching from a first state when the boom is in the retracted position to a second state when the boom is moved out of the retracted position, and the second switch switching from a first state when the boom is in the extended position to a second state when the boom is moved out of the extended position.

11. A headset according to claim 10, wherein the first state of each of the first and second switches is a closed state wherein a respective current flows through the respective switch to indicate that the boom is in the respective retracted or extended position, and wherein the second state of each of the first and second switches is an open state wherein the respective current is interrupted to indicate the boom is moved out of the respective extended or retracted position.

12. A headset according to claim 9, wherein the boom carries a metallic element on the proximal end portion thereof and wherein the switch includes a pair of spaced apart terminals to which the current is applied, the metallic element contacting the two terminals to connect the two terminals together and establish the closed state when the boom is in the retracted position thereof, the metallic element being moved out of contact with the two terminals to disconnect the terminals and establish the open state when the boom is moved out of the retracted position thereof.

13. A headset according to claim 12, wherein said terminals are provided on a detent structure and wherein the metallic element is a leaf spring that engages the detent structure to releasably retain the boom in the retracted position thereof.

14. A headset according to claim 11, wherein the boom carries a metallic element on the proximal end portion thereof and wherein each of the first and second switches includes a pair of spaced apart terminals to which the respective current is applied, the metallic element contacting the respective two terminals to connect the respective two terminals together and establish the respective closed state when the boom is in the respective retracted or extended position thereof, the metallic element being moved out of contact with the respective two terminals to disconnect the terminals and establish the respective open state when the boom is moved out of the respective retracted or extended position thereof.

15. A headset according to claim 14, wherein the terminals of the first switch are provided on a retracted position detent structure and wherein the metallic element is a leaf spring that engages the retracted position detent structure to releasably retain the boom in the retracted position thereof.

16. A headset according to claim 15, wherein the terminals of the second switch are provided on an extended position detent structure and wherein the leaf spring engages the extended position detent structure to releasably retain the boom in the extended position thereof.

17. A method for reducing background noise in a microphone output signal in a headset, the headset comprising a main body; a microphone boom carried by the main body and having a distal end portion; a microphone carried on the distal end portion of the microphone boom, the microphone being operable to receive audible noise and transmit a microphone output signal based on the received audible noise; the microphone boom being movable between a retracted position and an extended position, the distal end portion being positioned further forwardly towards the mouth of the user when the headset is attached to the user's head in the operative position so as to be closer to the user's mouth in the extended position than in the retracted position; the method comprising:

sensing a position of the microphone boom;

applying a gain to the microphone output signal, the gain being varied based on the sensed position of the microphone boom such that the gain is greater when the microphone boom is in the retracted position thereof than when the microphone boom is in the extended position thereof.

* * * * *